United States Patent [19]
Kurita et al.

[11] 3,957,645
[45] May 18, 1976

[54] FILTER PLATE FOR FILTER PRESS

[75] Inventors: Kenichiro Kurita, Suita; Tetsuya Kurita, Takarazuka; Hachiro Yamaji, Osaka, all of Japan

[73] Assignee: Kurita Machinery Manufacturing Co. Ltd., Osaka, Japan

[22] Filed: Dec. 10, 1974

[21] Appl. No.: 531,334

[30] Foreign Application Priority Data
Dec. 21, 1973  Japan.................................. 48-2060

[52] U.S. Cl. ............................................. 210/231
[51] Int. Cl.² ........................................ B01D 25/12
[58] Field of Search ..................... 210/224, 227–231

[56] References Cited
UNITED STATES PATENTS

| | | | |
|---|---|---|---|
| 1,349,238 | 8/1920 | Sweepland | 210/231 |
| 2,989,187 | 6/1961 | Demeper | 210/231 X |
| 3,543,938 | 12/1970 | Busse et al. | 210/231 |
| 3,656,622 | 4/1972 | Helmbach | 210/231 |
| 3,669,267 | 6/1972 | Hutton | 210/231 |
| 3,807,567 | 4/1974 | Iwatami | 210/231 |

*Primary Examiner*—Theodore A. Granger
*Attorney, Agent, or Firm*—Holman & Stern

[57] ABSTRACT

A filter plate assembly in which a filter wall has a large number of small pyramidal projections on its opposite surfaces, a peripheral frame portion supporting the outer periphery of the filter wall and formed with a prefilt passage and a filtrate passage extending therethrough, and a filter medium supported by the peripheral frame portion and covering the opposite surfaces of the filter wall. The peripheral frame portion has a rigid frame and elastic frames sandwiching the rigid frame and joined thereto. Each of the elastic frames is provided, in its surface, with an open groove to form a prefilt inlet port through which the prefilt passage communicates with a prefilt chamber defined by the filter plate and another filter plate to be fitted therewith, whereby clogging of the prefilt inlet port is eliminated.

4 Claims, 15 Drawing Figures

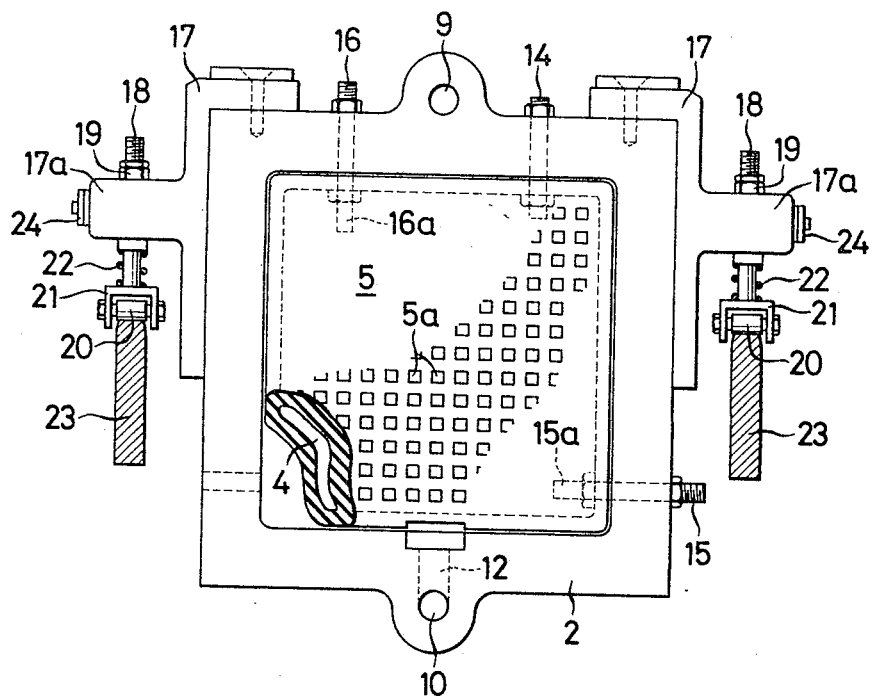
Fig.4
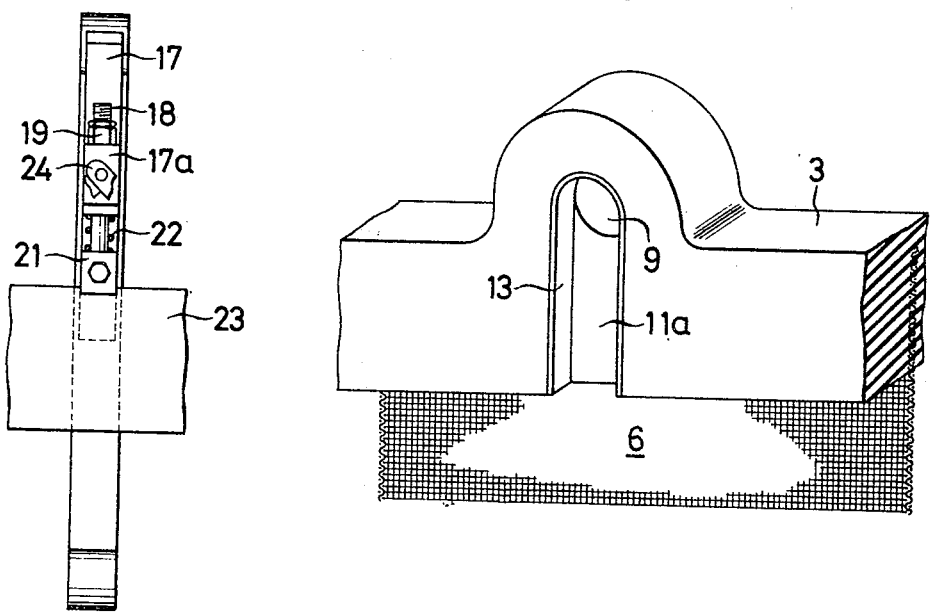
Fig.5
Fig.6

FILTER PLATE FOR FILTER PRESS

BACKGROUND OF THE INVENTION

The present invention relates to a filter plate for filter presses, more particularly to improvements in the prefilt inlet portion of filter plate.

PRIOR ART

Generally, filter presses of the recessed-plate type include those comprising a number of filter plates adapted to be fixedly fitted together side by side and each having a filter medium covering both surfaces thereof. The frame portion surrounding the filter plate is formed with a prefilt inlet port and a filtrate outlet port, and the prefilt inlet port is opened to a chamber provided between the opposing sheets of filter medium on the two adjacent filter plates. When the prefilt fed to the apparatus is filtered, the solids contained in the prefilt accumulate in the chambers in the form of cake and are discharged from the apparatus.

With so-called plate-and-frame filter presses, on the other hand, a frame interposed between each two adjacent filter plates has a prefilt inlet port which is opened to a prefilt chamber provided in the interior of the frame as disclosed in U.S. Pat. No. 3,289,845.

However, filter presses, whether of the recessed-plate type or plate-and-frame type, have the following drawbacks since the prefilt inlet port extends through the filter plate or filter frame to communicate with the prefilt chamber.

a. When the solids contained in the prefilt accumulate in the prefilt chamber in the form of cake as separated from the filtrate, the solids tend to clog the prefilt inlet port. This is especially true if the prefilt has high viscosity, as the inlet port is apt to be clogged frequently.

b. The solids blocking the prefilt inlet port are usually removed by shaking the filter plate or filter frame, or by supplying a wash liquor to the inlet port. With a filter press of the squeeze or expression type, however, it is extremely difficult to remove the cake from the inlet port, so that the apparatus may possibly be operated again before clogging is completely eliminated. If the supply of prefilt is resumed with some inlet ports left blocked, the prefilt chambers concerned will remain inoperative during the subsequent operation, thereby greatly reducing the overall efficiency of the filter press.

c. Since the prefilt inlet port is adapted to communicate with a prefilt guide bore which extends transversely through the filter plate or filter frame from inside thereof, the port is difficult to make in accurate dimensions.

SUMMARY OF THE INVENTION

An object of this invention is to eliminate clogging of the prefilt inlet ports formed in the filter plates and filter frames of the filter press described.

Another object of this invention is to make it easy to remove cake or like solids from the prefilt inlet ports when the ports are blocked with the solids.

Another object of this invention is to protect the wall defining the prefilt inlet port from damage caused by chemical substances contained in the prefilt so as prevent fatigue and degradation of the bored wall portion.

Still another object of this invention is to reinforce the rubber like material joined to the opposite surfaces of a frame portion surrounding the filter plate so as to impart sufficient strength to the material.

The filter plate, according to this invention, comprises a filter wall having a large number of small pyramidal projections on its opposite surfaces, a rigid frame surrounding the periphery of the filter wall in the form of a picture frame and made of cast iron or like rigid material, elastic frames sandwiching the rigid frame as joined thereto and made of rubber, synthetic resin or like elastic material, and a filter medium supported by the elastic frames to cover the opposite surfaces of the filter wall. The assembly of the rigid frame and elastic frames in the form of a peripheral frame has a prefilt passage and a filtrate passage each extending transversely therethrough, such that when a number of the filter plates are intimately fitted together, the prefilt passages thereof are aligned to serve as a prefilt passageway, with the filtrate passages similarly aligned to provide a filtrate passageway. The rigid frame is formed with a filtrate outlet port communicating with the filtrate passage, so that the filtrate flowing into a space between the filter medium and the filter wall after passing through the filter medium is guided into the filtrate passageway by way of the filtrate outlet port and is run off from the filter press.

When a number of the filter plates are fitted together side by side, a prefilt chamber is provided between each two adjacent filter plates. The prefilt chamber communicates with the prefilt passages of the adjacent plates by way of open grooves each formed in the surface of elastic frame of each plate. When the filter plates are fitted together as above, the open groove in the elastic frame of one filter plate is brought into register with the corresponding groove in the elastic frame of another adjacent filter plate to form a prefilt inlet port through which the prefilt is fed from the prefilt passage to the prefilt chamber.

With a filter press including the filter plates of this invention as its filtering elements, the prefilt is fed from the prefilt passageway into the prefilt chambers via the prefilt inlet ports each provided by a pair of the registered open grooves. The prefilt is then filtered by the filter medium, whereupon the resulting filtrate flows through the filtrate outlet ports and is discharged by way of the filtrate passageway, whereas the solids or cake is retained in the prefilt chambers. After completion of one cycle of filtering operation, the supply of prefilt is stopped, and the filter plates are separated from each other to remove the cake from the spaces between the separated plates.

Preferably, the filter press is of the squeeze or expression type in which the filter wall is made of an elastic material and has an empty interior chamber to which compressed air or like pressurized fluid is fed. The pressure fluid supplied to the interior chambers compresses the prefilt or, especially the cake, retained in the prefilt chambers to cause the filtrate to flow out through the filter medium.

As already described, the cake is removed upon the separation of the filter plates from each other. At this time, the prefilt inlet port is split to expose the grooved portions. This facilitates removal of the solid matter contained in the prefilt and deposited on the grooved portions, making it possible to completely eliminate the possible reduction in filtration efficiency owing to the accululation of cake.

Since the open groove providing the prefilt inlet port is formed in the exposed wall surface of the elastic frame, the port is readily produced with dimensions and free of difficulties heretofore experienced.

According to this invention, the grooved wall surface of the elastic frame is fixedly provided with a covering member made of a suitable metal material or some other material having high resistance to chemicals so as to prevent the possible damage and fatigue caused by the pressure of the prefilt supply or to eliminate swelling, corrosion and like objections attributable to the chemical substances contained in the prefilt. The covering member is serviceable also as a fastening member for securing the filter medium to the filter plate when suitably shaped and having an appropriate thickness.

Other objects and features of this invention will become more apparent from the following description.

BRIEF DESCRIPTION OF THE DRAWINGS

FIG. 4 is an enlarged side elevation showing the rigid frame and filter wall of the filter plate;

FIG. 5 is a front view of FIG. 4;

FIG. 6 is a fragmentary, enlarged perspective view showing an open groove to provide a prefilt inlet port;

DESCRIPTION OF THE PREFERRED EMBODIMENTS

Figure 1:
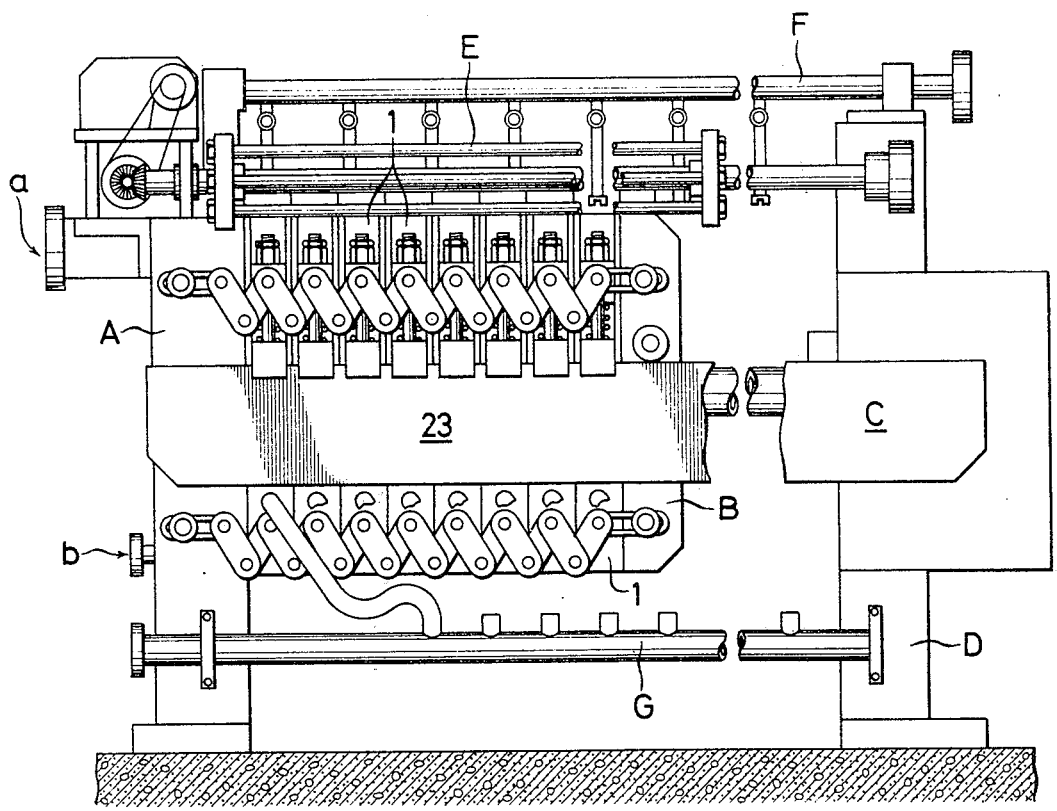
FIG. 1 is a front view of an embodiment according to this invention.

As shown in FIG. 1, the filter press of this invention comprises a frame A serving as one end wall for an assembly of a number of filter plates 1 and provided with conduit flanges $a$ and $b$ to be connected to unillustrated prefilt feeding means and unilllustrated filtrate discharging means respectively, and a frame D having hydraulic means C or like pressing means for pressing the assembly of filter plates 1 against the frame A through the other end wall B for the assembly. The end wall B and filter plates 1 are disposed between the frames A and D. Horizontally extending between the frames A and D are side rails 23 for movably supporting the filter plates 1. Also provided between the frames A and D in a known manner are drive means E for shaking the filter plates 1 to remove the cake, a wash liquor feeder F, and means G for feeding a pressurized fluid which is provided if the filter press is of the expression type.

FIGS. 2 to 5 show a preferred embodiment of filter plate of this invention which is adapted for use in a filter press of the expression type in which primary filtration is conducted by a usual filter press operation and the concentrated prefilt remaining in prefilt chambers and containing a relatively large amount of solids is thereafter expressed for secondary filtration by pressing means employing a pressurized fluid such as compressed air so as to remove the resulting solids from the prefilt chambers as a cake.

The filter plate 1 comprises a filter wall 5, a rigid frame 2 surrounding the wall 5 in the form of a picture frame to support the wall, elastic frames 3 made of rubber, synthetic resin or like elastic material and joined to the opposite side surfaces of the rigid frame 2 respectively, and a filter medium 6 covering both surfaces of the filter wall 5 as supported by the elastic frames 3. The wall 5 is made of rubber or like elastic material and has a large number of pyramidal projections 5$a$ on its opposite surfaces. The wall is in the form of a bag having an interior chamber 4 to which pressurized fluid such as compressed air is supplied. The rigid frame 2 is made of cast iron or some other suitable rigid material.

To adapt the filter plate 1 for use in an ordinary filter press intended merely for primary filtration, the elastic filter wall 5 may be replaced by a simple plate provided with a number of pyramidal projections on its opposite surfaces. Thus, the application of the present invention is not limited to filter presses of the particular type.

Figure 2:
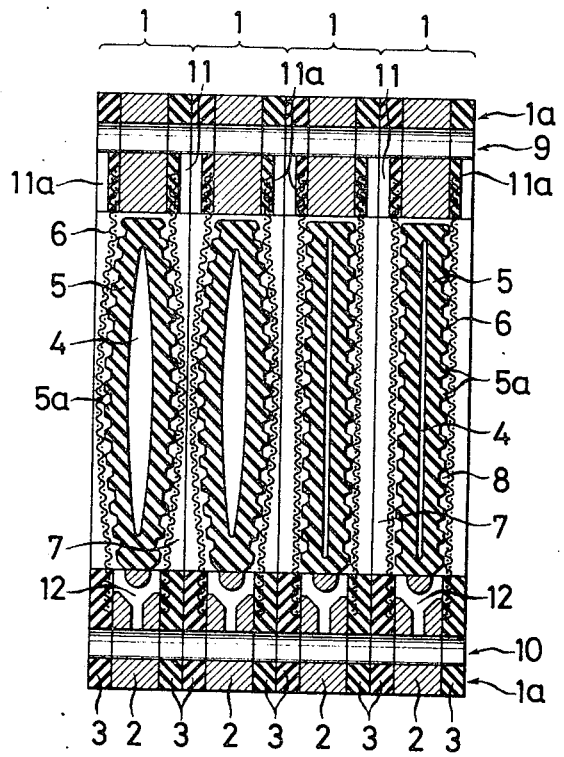
FIG. 2 is an enlarged section showing the principal part of the same.

When the filter plates 1 are intimately fitted together as seen in FIG. 2, a prefilt chamber 7 is provided between the sheets of filter medium 6 on the surfaces of adjacent filter plates 1. Between the filter medium 6 on the surface of each filter plate 1 and the surface of the wall 5 on the rear side of the medium 6, there is a filter chamber 8 including a space given at least by the pyramidal projections 5$a$.

The peripheral frame portion 1$a$ of the filter plate 1 composed of the rigid frame 2 and elastic frames 3 has a prefilt passage 9 and a filtrate passage 10 extending through the portion 1$a$ transversely thereof. When the filter plates 1 are fitted together, the prefilt passages 9 thereof are aligned to communicate with a bore (not shown) formed in the flange $a$ on the frame A connected to the prefilt feeding means, while the filtrate passages 10 in alignment likewise communicate with a bore (not shown) formed in the flange $b$ for discharging the filtrate.

Figure 3:
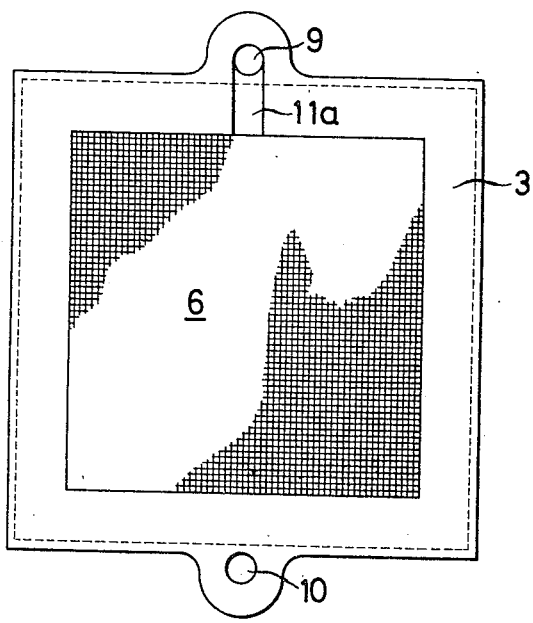
FIG. 3 is a side elevation showing the elastic frame and filter medium of a filter plate.

Each end surface of the peripheral frame portion 1$a$ having the prefilt passage 9, namely the surface of each of the elastic frames 3 is formed with an open groove 11$a$ as shown in FIGS. 2 and 3, such that when the filter plates 1 are fitted together, the open grooves 11$a$ in the adjacent filter plates 1 are in register with each other to form a prefilt inlet port 11 through which the prefilt passages 9 communicate with the prefilt chamber 7 provided between the adjacent filter plates 1.

The peripheral frame portion 1$a$ is also formed with a filtrate outlet port 12 through which the filter chambers 8 communicate with the filtrate passage 10.

With reference to FIG. 4, the filter wall is attached to the rigid frame 2 by a fastening member 14. The rigid frame 2 is further provided with a pipe 15 for admitting a pressurized fluid and a pipe 16 for discharging the pressurized fluid. The pipes 15 and 16 have ends 15$a$ and 16$a$ which are opened to the interior of the empty chamber 4 in the filter wall 5. The pipe 15 is connected to the pressurized fluid feeding means G in FIG. 1 and the pipe 16, to unillustrated discharge means.

Arms 17 are fixedly mounted on the shoulder portions of the rigid frame 2. Extending through the distal end of each arm 17 is a guide rod 18 for guiding the frame 1 for the upward and downward movement thereof. The guide rod 18 is provided at it upper end with a stop 19 for limiting the upward movement of the filter plate 1 and has a bracket 21 at its lower end for supporting a roller 20. A spring 22 provided between the bracket 21 and the arm 17 biases the filter plate 1 upward. The rollers 20 on the opposite sides of the plate are placed on the side rails 23 to support the filter plate 1 and render the plate movable on the side rails 23.

As seen in FIGS. 1, 4 and 5, a number of filter plates 1 supported by the side rails 23 are interconnected by links 24. When the filter plate 1 at the right end of the assembly in FIG. 1 is moved rightward to separate the filter plates 1 from each other, all the filter plates are moved together as spaced apart from each other by a distance determined by the links 24.

Prefilt is fed to the prefilt chambers 7 (see FIG. 2) between the filter pltes 1 which are intimately fitted together and pressed against the frame A by the hydraulic means C or like pressing means as illustrated in FIG. 1. The resulting filtrate flows through the filter medium 6 into the filter chambers 8, from which it is guided through the filtrate outlet ports 12 into the aligned filtrate passages 10 and is discharged from the filter press. This increases the relative content of solids contained in the prefilt remaining in the prefilt chambers 7.

Compressed air or like pressurized fluid is then forced into the empty chambers 4 of elastic filter walls 5, whereby the filter walls 5 are bulged or distended as shown on the left-hand side of FIG. 2 to compress the prefilt chambers 7 while supporting the filter medium 6 with the ends of projections 5a on the surfaces of the walls. Consequently, the concentrated prefilt in the prefilt chambers 7 is squeezed or expressed, permitting the filtrate to be separated from the concentrated prefilt. The filtrate flows through the spaces between the projections 5a, passes through the filtrate outlet ports 12 and is run off from the filter press by way of the aligned filtrate passages 10. On the other hand, the solids are retained in the prefilt chambers 7 in the form of a cake.

In this way, primary and secondary filtering operations are completed, whereupon compressed air is discharged from the interior of the filter walls 5. The filter plates 1 are then freed from pressing engagement and move rightward in FIG. 1, thereby being separated from each other. The prefilt chambers 7 are therefore opened, permitting the cake in the chambers 7 to fall off. At this time, the shaking means E moves the filter plates 1 up and down to force the cake to drop off. If it is difficult to cause the cake to drop under gravity because of its high viscosity, a compressed fluid is intermittently sent into the empty chambers 4 between the filter walls 5 to repeatedly expand and contract the filter walls and to thereby remove the cake layer from the surface of the filter medium 6. During the operation described, the open grooves 11a providing each prefilt inlet port 11 between the filter plates 1, intimately fitted together, are moved away from each other by the foregoing separating procedure to open the port, so that the cake deposited in the open grooves 11a can be removed with ease.

If the filter walls 5 of the filter plates 1 are expanded or contracted at the same time, the cake in the prefilt chambers 7 will be compressed on the opposite sides thereof and may possibly be prevented from dropping. Accordingly, it is preferable to expand or contract the two adjacent filter plates 1 alternately.

Preferably, the open groove 11a for forming the prefilt inlet port 11 as seen in FIG. 6, is provided with a covering member 13 made of a suitable metal material or corrosion resistant material so as to protect the wall defining the groove 11a. The covering member prevents the grooved surface 11a from being deformed and degraded by the pressure applied to the prefilt for expression or from corrosion to be otherwise caused by chemical substances contained in the prefilt.

Figure 7:
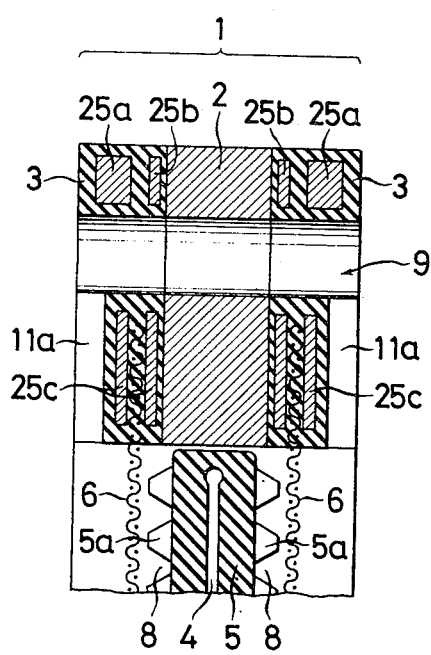
FIG. 7 is a further enlarged fragmentary view in section showing the principal part of another embodiment of filter plate.

FIG. 7 shows reinforcing core members 25a, 25b and 25c embedded in the elastic frame 3 and made of a roughly worked stainless steel material or the like. The reinforcing members strengthen the elastic frame 3 and prevent deformation of the frame 3 which is made of hard rubber or the like and is used in combination with the rigid frame 2 chiefly made of cast iron.

Figure 8:
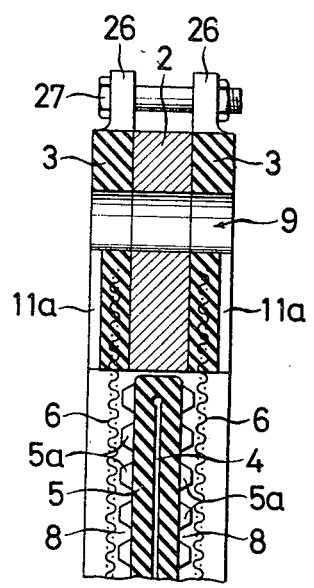
FIG. 8 is a view in section showing the principal part of another embodiment of filter plate.

FIG. 8 shows the rigid frame 2 as sandwiched between elastic frames 3 each having a projecting piece 26 extending outward from its peripheral portion. The projecting pieces 26 are fastened together by bolt and nut units 27, whereby the rigid frame 2 and elastic frames 3 can be joined together more effectively without allowing any liquid to leak from between the joined surfaces.

Figure 9:
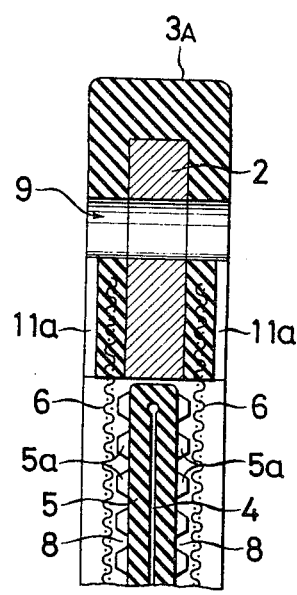
FIG. 9 is a view in section showing the principal part of another embodiment of filter plate.

FIG. 9 shows the rigid frame 2 having outer periphery thereof completely covered with part of an elastic frame 3A, whereby both the frames 2 and 3A can be joined together more effectively and tightly.

According to this invention in which the prefilt inlet port 11 is adapted to be separated into two open grooves 11a when the adjacent filter plates 1 are separated, the cake and solids deposited in the grooves can be removed with extreme ease. In fact, the wash liquor forced out from the wash liquor feeder F is applied to the grooved portions 11a when washing the filter medium, thus making it very easy to wash the grooved portions 11a and to remove the cake therefrom quickly.

Figure 10:
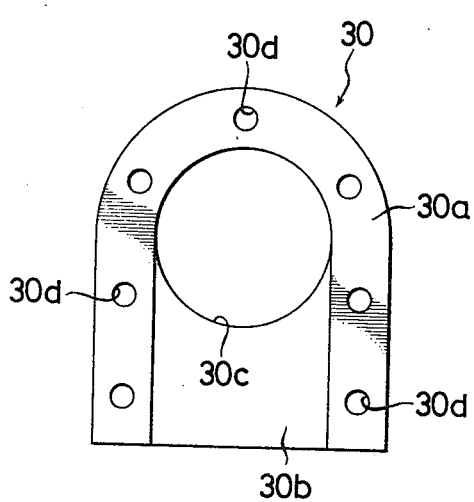
FIG. 10 is a side elevation showing an embodiment of covering member to be fitted in the open groove and defining the prefilt inlet port.
Figure 11:
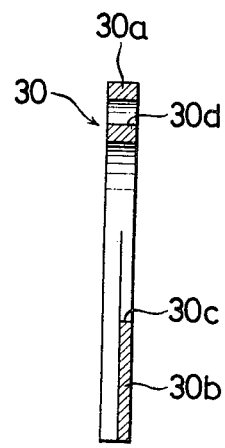
FIG. 11 is a view in section of the same.
Figure 12:
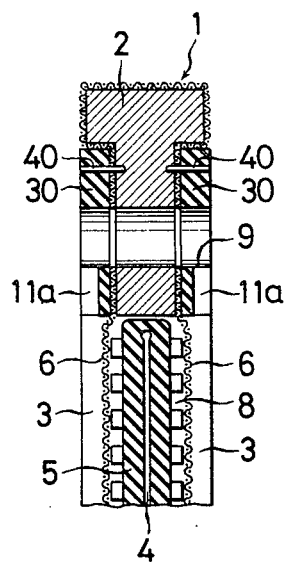
FIG. 12 is a view in section showing the covering member as attached in place.

The covering member for protecting the grooved portion 11a can be variously modified as shown in FIGS. 10 to 12.

FIGS. 10 and 11 show a covering member 30 including an edge 30a in the form of a horseshoe and a bottom plate 30b having an aperture 30c of an identical shape with the section of the prefilt passage 9. Bolt holes 30d are formed in the edge 30a at suitable spacings, and the covering member 30 is fastened to the rigid frame 2 by bolts 40 extending through the holes 30d to protect the grooved surface 11a defining one half of the prefilt inlet port 11. The covering member 30 serves also as a fastening member for securing the filter medium 6. (See FIG. 12).

Figure 13:
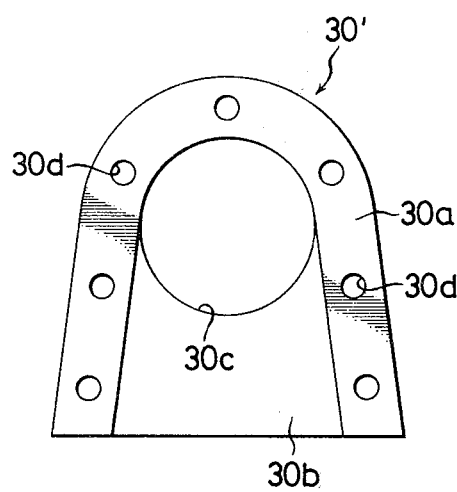
FIG. 13 is a side elevation showing another embodiment of the covering member.

FIG. 13 shows a covering member 30' having a flaring edge 30a resembling a horseshoe. The covering member of this shape is advantageous in that the cake or solids can be removed from the surface of the member 30' with greater ease.

Figure 14:
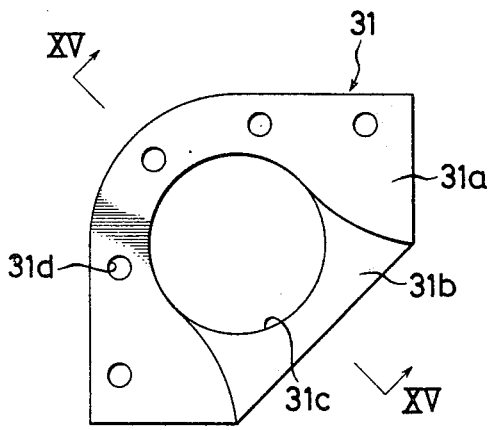
FIG. 14 is a side elevation showing another embodiment of the covering member.
Figure 15:
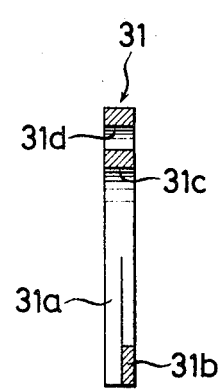
FIG. 15 is a view in section taken along the line XV—XV in FIG. 14.

With reference to FIGS. 14 and 15, there is shown a covering member 31 for the filter plate 1 in which the prefilt passage 9 is formed in a corner of the plate. The covering member has an edge 31a which extends substantially at a right angle and a bottom plate 31b for defining one half of the prefilt inlet port 11. It has an aperture 31c of an identical shape with the section of the prefilt inlet port 9 and bolt holes 31d.

What is claimed is:

1. A filter plate assembly for a filter press comprising:
a rigid frame with spaced, opposed first and second peripheral faces surrounding a cavity defined within said frame;
filter medium sheets in sealing relationship with each first and second peripheral face of said rigid frame;
elastic frame means at the opposed peripheral faces and supporting the respective filter sheets at peripheral edges thereof and providing sealing means sealing said filter sheet edges to said first and second frame faces;
and an expansible-and-contractable, resilient bag including an inlet opening therein located within the cavity defined by the frame, said bag including a plurality of pyramidal projections on opposed outer surfaces of said bag adjacent the filter medium sheets so that said projections provide support means for the filter medium sheets supported by said opposed first and second peripheral frame faces, prefilt inlet means in said frame in fluid communication with the outer surface of each opposed filter medium sheet, filtrate outlet means in said frame in fluid communication with the inner surface of each filter medium sheet supported by said pyramidal projections, fluid-pressure inlet means in said frame in communication with said bag inlet opening so that fluid pressure introduced into said bag through said bag inlet opening expands said resilient bag toward said filter medium sheets at each opposed surface of said bag whereby clogging of the filter plate assembly is substantially eliminated.

2. The filter plate assembly as set forth in claim 1 wherein the elastic frame includes a reinforcing material embedded therein.

3. The filter plate as set forth in claim 1 wherein a covering member is fixed to a wall defining an open groove for forming the prefilt inlet.

4. The filter plate assembly as set forth in claim 3 wherein the covering member has an edge in the form of a horseshoe, a bottom plate defining the bottom of the open groove and an aperture communicating with the prefilt inlet and is fixed to the rigid frame.

* * * * *